J. E. GRAYBILL.
GLASS CUTTING MACHINE.
APPLICATION FILED SEPT. 19, 1907.
921,979.
Patented May 18, 1909.
2 SHEETS—SHEET 2.
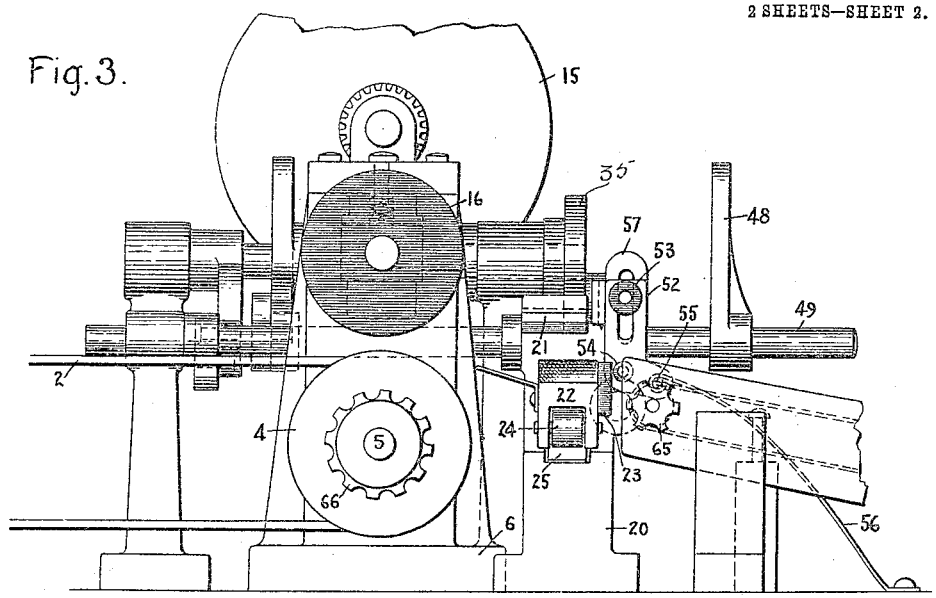
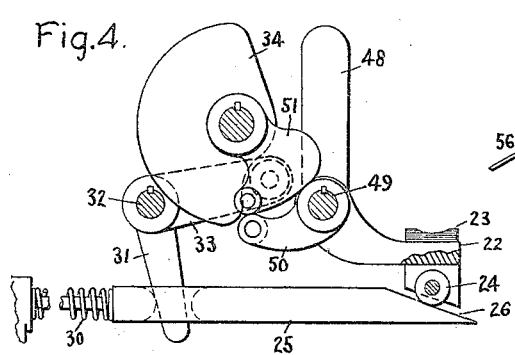
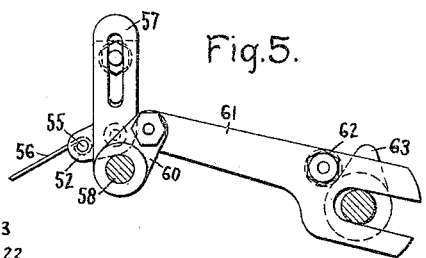
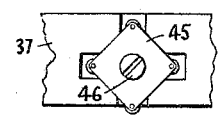
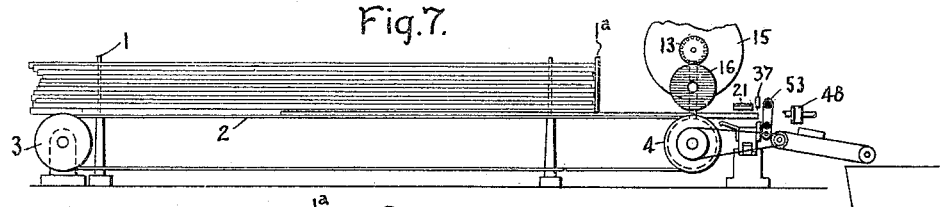
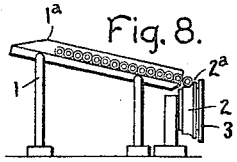
Witnesses:
Irving E. Steers
J. Ellis Ven.
Inventor
John E. Graybill.
by Albert G. Davis
Att'y.
THE NORRIS PETERS CO., WASHINGTON, D. C.

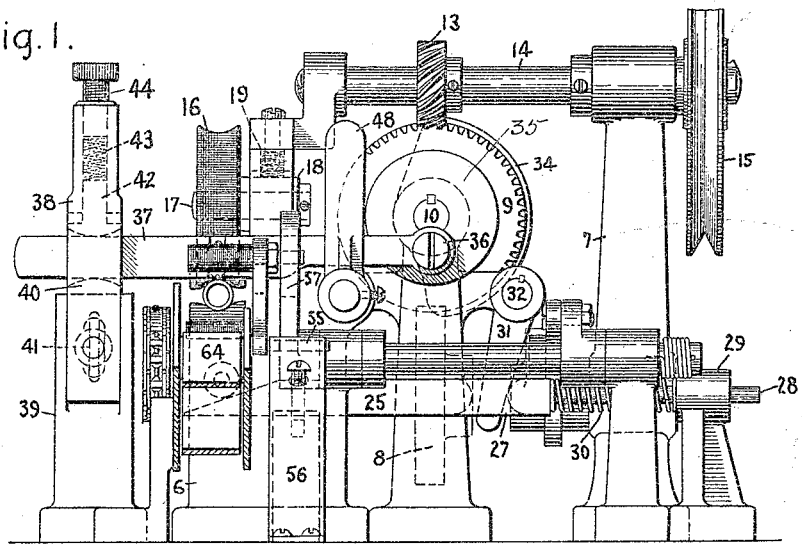

UNITED STATES PATENT OFFICE.

JOHN E. GRAYBILL, OF YORK, PENNSYLVANIA, ASSIGNOR TO GENERAL ELECTRIC COMPANY, A CORPORATION OF NEW YORK.

GLASS-CUTTING MACHINE.

No. 921,979.     Specification of Letters Patent.     Patented May 18, 1909.

Application filed September 19, 1907. Serial No. 393,683.

*To all whom it may concern:*

Be it known that I, JOHN E. GRAYBILL, a citizen of the United States, residing at York, county of York, State of Pennsylvania, have invented certain new and useful Improvements in Glass-Cutting Machines, of which the following is a specification.

My invention relates to machines for cutting glass to predetermined lengths or sizes, and more particularly to machines for cutting glass tubing into sections of predetermined lengths to be used as stems for incandescent lamps.

The stems of incandescent lamps for carrying the filament and leading-in wires are formed of short glass tubes which must have smooth, straight edges and which should all be of the same length to enable the various operations of forming the stems and sealing them into the lamp to be performed in a satisfactory manner and produce finished lamps of uniform size and appearance. These tubes are usually made by cutting glass tubing into the proper lengths by hand, and unless the operator exercises considerable care and skill the finished tubes are apt to vary in length and have ragged edges. Hand cutting is comparatively slow and expensive, and even under favorable conditions the waste caused by tubes being cut to the wrong length is considerable.

The object of my invention is to provide a machine which will rapidly and automatically cut off pieces of predetermined lengths and smooth edges from a sheet or tube of glass, which requires no attention beyond that necessary to keep up the supply of material to be operated upon, which does not require a skilled operator, and in which the cutting off of the pieces of the glass is accomplished with a minimum breakage and waste.

In carrying out my invention the sheet or tube of glass is automatically fed forward a predetermined distance, is then brought into operative relation to a cutter and firmly held while the cutter makes a groove or nick in it, and a suitable mechanism then breaks off the glass at the nick or groove. These various operations can be carried out in many different ways and by many different forms of mechanism and in the preferred form the breaking off is accomplished by a mechanism which moves away from the nick or groove along an unsupported portion of the glass, and in so moving exerts a constantly increasing strain tending to break off that portion of the glass, thereby closely imitating the action and the good results of breaking by hand.

My invention will best be understood in connection with the accompanying drawings which are merely an illustration of one form or embodiment of my invention and in which—

Figure 1 is a view with the parts thereof in the position assumed by them at the moment of cutting the glass; Fig. 2 is a top plan view of the mechanism shown in Fig. 1; Fig. 3 is a side view of the mechanism shown in Fig. 1; Fig. 4 is a sectional view on the line 4, 4, of Fig. 2; Fig. 5 is a sectional view on the line 5, 5, of Fig. 2; Fig. 6 is a view of the cutter for the glass; Fig. 7 is a diagrammatic representation showing the various elements of the machine in operation on a piece of glass tubing, and Fig. 8 is an end view of the rack for the glass tubing and the belt for feeding the tubing from the rack.

The general arrangement of the machine which I have shown as one embodiment of my invention will best be understood from Fig. 7. The glass tubing which is to be cut into predetermined lengths is mounted upon a rack 1 set at an angle of about 30 degrees with the horizontal and having a flange $1^a$ at one end to engage the ends of the tubing which tends to slide down the rack on to any suitable conveyer, such as a moving belt 2 having a fillet $2^a$ on the side opposite the rack and carried by an idler pulley 3. The belt is driven from a live pulley 4 mounted upon a shaft 5 driven by the source of power which actuates the machine and the relation between the end of the flange $1^a$ and the fillet $2^a$ is such that only one piece of tubing at a time can be carried past the flange by the belt. As shown in Fig. 1, the shaft 5 is suitably mounted in standards 6 and 7, and carries a spiral gear 8 meshing with a spiral gear 9 mounted upon a cam-shaft 10 rotating in bearings 11 and 12. A spiral gear 13, secured to a countershaft 14 which carries the driving pulley 15, meshes with and drives the spiral gear 9, which in turn drives the spiral gear 8 and the shaft 5 so that the shaft 5 rotates with the driving pulley 15. Immediately above the live pulley 4, carrying the belt 2, is mounted a feed roller 16 made of soft rubber or similar material and mounted upon a shaft 17 rotatably carried in a bearing 18 slidably mounted in the standard 6 and yieldingly held by means of a spiral spring 19 in the position shown in Fig. 3 to engage the glass tubing carried on the constantly moving belt 2.

The glass tubing fed into the machine by means of the moving belt 2 and the feed roller 16 must be firmly held while the cut is being made and in the machine shown this result is obtained by means of a holding clutch which firmly grips the glass tubing at the proper time. A standard 20 mounted close to the standard 6 carries a fixed jaw 21 faced with a cushion of soft rubber for engaging the glass tubing when the clutch is closed. The coöperating member of the clutch is a movable jaw 22 mounted to slide vertically in the standard 20, and the glass tubing is engaged by a cushion of soft rubber 23 attached to the jaw 22 and coöperating with the cushion of the fixed jaw. The movable jaw 22 carries a roller 24 which coöperates with a sliding bar 25 moving in guides formed in the standard 20. The bar is provided at one end with an incline 26 for engaging the roller, and near the other end with a slot 27 for receiving an actuating arm. The bar carries at the end opposite the incline 26 a guide rod 28 slidably mounted in a guide 29 and surrounded by a spiral spring 30, one end of which bears against the guide and the other end against the bar. The bar 25 is moved to compress the spiral spring 30 by means of an actuating arm 31 engaging the slot 27 in the bar, and the spring in expanding moves the bar in a direction to raise the movable jaw 22 of the clutch and thereby cause the holding clutch to grip the glass tubing. The actuating arm is mounted upon a rock-shaft 32 which carries another arm 33 engaged by a cam 34 keyed to the cam-shaft 10. The cam is so proportioned and set upon the cam-shaft that at the time the glass tubing is fed forward the bar 25 is moved to compress the spring 30 so as to cause the holding clutch to open, whereby the glass tubing is permitted to pass through the clutch. After the tubing is in position, the cam 34 permits the spring 30 to thrust the bar 25 under the roller 24, thereby closing the holding clutch upon the tubing by spring pressure.

When the glass is firmly held in the holding clutch in the proper position to be operated upon, the cutter is caused to operate by mechanism driven from the countershaft 14. The mechanism for operating the cutter may assume many different forms but in the form shown in the drawings a crank disk 35 is keyed to the end of the constantly rotating cam shaft 10. This disk carries a crank-pin 36 to which is fastened one end of a connecting rod 37, the other end being restrained by a guide 38, supported by a pedestal 39 set in proper relation to the other elements of the machine. The guide 38 has a slot through which the rod 37 extends and at the bottom of the slot a bearing 40 is adjustably secured by a bolt 41 passing through slots which permit vertical adjustment of the bearing 40. The connecting rod 37 is held in engagement with the surface 41 by a pin 42 having a rounded head and forced against the connecting rod by means of a spring 43, the tension of which may be varied by a thumb-screw 44. A cutter block 45 is securely attached to the connecting rod between the crank-pin and the guide. The cutter block is shown in Fig. 6 and consists of a square block held in position by a set-screw 46 and carrying at each corner rotary cutters for acting upon the glass. It is evident that any other form of cutter could be substituted for that shown in the drawing without changing the scope of my invention.

In order to insure that the pieces of tubing cut off by the machine are of the proper length, it is necessary to provide some sort of a stop which will permit the tubing to be fed forward only a predetermined distance. Various mechanisms may be used for accomplishing this purpose but in the machine shown in the drawings a stop 48 is used which is normally out of the path of movement of the tubing. After the piece of tubing has been cut off, and before the tubing is fed for the next cut, the stop 48 is moved to such a position that the end of the advancing tubing will strike it and be stopped by it. The stop is mounted upon and moved by a rock-shaft 49 mounted in suitable bearings and operated by means of an actuating arm 50 coöperating with a cam 51 mounted upon the constantly rotating cam-shaft 10. As shown in Fig. 4, the cam 51 is so shaped that the stop 48 is swung into the path of movement of the tubing just as the tubing is being fed forward.

The cutter mounted upon the connecting rod 37 does not cut entirely through the glass operated upon by it, but makes only a nick or groove in the surface. It is necessary, therefore, after the cutter has operated, to subject the glass to pressure to cause it to break off at the point where it is cut or grooved. It is desirable that the mechanism for doing this shall operate in much the same manner as though the glass were broken off by hand, and pressure should, therefore, be applied transversely to the glass, tending to bend it at the nick or groove until it breaks. In order to secure the best results the pressure should first be applied to the glass near the nick or groove, and the point of application of the pressure should then be moved along the glass away from the groove, while the pressure is simultaneously increased, until finally the longitudinal strain due to the movement along the glass of the means for applying pressure, and the transverse strain due to the increase of pressure causes a clean sharp break at the nick or groove similar to that produced by hand by a skilled workman. My invention comprises means for automatically subjecting the grooved glass to strains similar to those produced by hand for making a clean sharp break, and may be embodied in many different forms. One arrangement which I have devised for breaking off the tubing is shown in these drawings and comprises a breaking-off frame 52, near one end of which a breaking-off roller 53 of sof trubber is adjustably mounted in a slot which permits adjustment longitudinally of the frame. The frame also carries an auxiliary roller 54, mounted adjacent to the roller 53 and when the frame is in normal position the auxiliary roller is beneath the section of tubing which is to be broken off, while the breaking-off roller is above said section. The breaking-off frame is provided with a pivot 55 yieldingly supported in any suitable manner. As shown in the drawings, this pivot is supported upon the free end of a flat spring 56, the other end of which is firmly secured to the base of the machine or other suitable support. The breaking off frame is actuated by a crank 57 having a slot therein into which the shaft of the breaking-off roller projects to form a driving connection between the crank and the breaking-off frame. The crank 57 is mounted upon a rock-shaft 58 held in normal position by means of a spiral spring 59, having one end attached to the bearing for the rock-shaft and the other end to the shaft. The rock-shaft also carries an actuating-crank 60 connected to one end of a push rod 61 which has the other end forked to embrace the shaft 5 to be guided thereby. The push rod 61 carries a roller 62 coöperating with a cam 63 upon the shaft 5 set to cause the movement of the breaking-off frame in proper time relation to the other elements of the machine.

After the pieces of the tubing are broken off they fall upon a conveyer 64 consisting of a moving belt for carrying them to a convenient receptacle. This belt is mounted upon an idler pulley and upon a live pulley, which latter is driven by means of a sprocket-wheel 65 from the shaft 5, which carries a sprocket-wheel 66 for the purpose of driving the conveyer.

The operation of the device is as follows; The glass tubing upon the belt 2, held in firm engagement with the belt by the feed roller 16, is moved forward until it is stopped by coming into engagement with the stop 48. The belt continues to move while the tubing is held stationary against the stop 48. The cam 34 permits the bar 25 to move under the pressure of the spring and cause the movable jaw 22 to rise and firmly grip the tubing between the rubber block 23 and the rubber surface on the fixed jaw 21. This movement of the jaw 22 elevates the tubing into such position that it is engaged by one of the cutters on the cutter block 45, and while the tubing is held firmly in the holding clutch the cutter makes a nick or groove in it, after which the crank 57 moves the breaking-off frame to break off the tubing at the nick or groove. During the first portion of its movement this frame rotates about its yielding pivot 55 on the free end of the spring 56 until the auxiliary roller 54 engages the under side of the tubing; then the spring 56 yields and the frame rotates about the auxiliary roller 54 as a center, putting the spring 56 under continually increasing strain. Eventually the frame rotates so far that the breaking-off roller 53 engages the upper side of the section of tubing beyond the nick or groove, and the tube is then subjected to a downward pressure near the end by the breaking-off roller, and to an upward pressure near the nick or groove by the auxiliary roller 54, due to the action of the spring 56. The breaking-off frame moves along the tubing away from the nick or groove, tending to pull the tubing in two, and at the same time the continued rotation of the crank 57 causes the pressure of the breaking-off roller to become greater and greater until finally the tubing is broken off in much the same way as it would be broken by hand, and a tube of proper length to be used as a stem falls upon the conveyer and is carried to a receptacle. The holding clutch is then released, the tubing is again fed forward and the operation is repeated.

My invention may be embodied in many other forms than that shown and described, and I do not restrict it to the precise form shown but intend to cover by the appended claims all changes and modifications within the spirit and scope of my invention.

What I claim as new and desire to secure by Letters Patent of the United States, is,—

1. In a glass cutting machine, the combination with a cutter, of a continuously operating feed mechanism yieldingly engaging the glass to move it into operative relation to the cutter, and a stop acting upon the glass to regulate the extent of movement thereof.

2. In a glass cutting machine, the combination with a cutter, of a feed mechanism for frictionally engaging the glass, driving means for continuously operating the feed mechanism to move the glass into operative relation to the cutter, and a stop in the path of movement of the glass and engaged thereby to regulate the extent of movement.

3. In a glass cutting machine the combination with a cutter, of a carrier, driving means for continuously moving the carrier toward the cutter to bring the glass into operative relation to the cutter, yielding means coöperating with said carrier to hold the glass in engagement therewith, and a stop in the path of movement of the glass and engaged thereby to limit its movement.

4. In a glass cutting machine, the combination with a cutter and means for driving it, of feed mechanism arranged to move the glass past the cutter out of operative relation thereto and means actuated in predetermined relation to the feed mechanism to bring the glass and the cutter into operative relation to each other.

5. In a glass cutting machine, the combination with a cutter, of mechanism for feeding the glass past the cutter, and means for moving the glass at an angle to the direction of feed thereof to bring it into operative relation to the cutter.

6. In a glass cutting machine, the combination with a reciprocating cutter, of feed mechanism for moving a glass tube across the path of the cutter and out of engagement therewith, and means for moving said tube into the path of the cutter.

7. In a glass cutting machine, the combination with a movable cutter, of a continuously moving feed mechanism for frictionally engaging the glass to feed it past the cutter, and means movable in the plane of movement of the cutter for moving the glass out of engagement with the feed mechanism and into operative relation to the cutter.

8. In a glass cutting machine, the combination with a cutter, of a support, and means for moving the support into engagement with the glass directly opposite the cutter to relieve the glass of the strain of cutting.

9. In a glass cutting machine, the combination with a cutter and means for moving the cutter, of a block mounted to reciprocate in the plane of movement of the cutter for engaging the glass directly opposite the cutter, and means for moving said block into yielding engagement with the glass.

10. In a glass cutting machine, the combination with a movable cutter, of a continuously moving belt for feeding the glass transversely of the cutter, a block mounted to reciprocate in the plane of movement of the cutter, a spring for moving the block toward the cutter to engage the glass and move it out of engagement with the belt and into operative relation to the cutter, and a cam for compressing said spring and drawing said block away from the cutter.

11. In a glass cutting machine, the combination with a movable cutter, of a fixed block near said cutter, and yielding means for moving the glass into engagement with said block to intersect the path of the cutter.

12. In a glass cutting machine, the combination of a movable member for engaging the glass to move it into range of the cutter, of a second member coöperating therewith to clutch the glass when so moved, and means for yieldingly moving said movable member.

13. In a glass cutting machine, the combination with a cutter for cutting a groove in the glass, of members mounted parallel to the path of the cutter to engage opposite sides of the glass as it passes between them, and means for simultaneously varying the relation of said members to the groove in the glass and the pressure of said members on the glass.

14. In a glass cutting machine, the combination with a support for the glass, of means for exerting upon the glass a transverse stress varying with the distance between the support and the point of application of stress.

15. In a glass cutting machine, the combination with means for cutting a groove in the glass, of a member for engaging one side of the glass near said groove, a second member for engaging the other side of the glass, and means for simultaneously varying the distance of the point of engagement of one of said members from the groove and the pressure exerted by said members on the glass.

16. In a glass cutting machine, a breaking mechanism comprising members adapted to engage the glass on opposite sides, and means for simultaneously separating said members longitudinally of the glass and increasing the pressure of said members upon the glass.

17. In a glass cutting machine, the combination with a cutter for grooving the glass, of a support for engaging the glass at the groove, a movable breaking member mounted to engage the unsupported portion of the glass on a line parallel to said groove, and means for moving said member away from said support in a path intersecting said unsupported portion.

18. In a machine for cutting glass tubing, the combination with a cutter for grooving this tubing, of a clutch for gripping the tubing near the groove, a breaking member yieldingly held in engagement with the portion of the tubing projecting beyond the clutch, and means for moving said member away from the clutch at an angle to the projecting portion of the tubing.

19. In a device for breaking off glass tubing, the combination with a support for holding the tube with a portion thereof unsupported, a roller mounted adjacent said support to move at an angle to the unsupported portion of the tube, a yielding support for the roller, and driving means engaging said support to move said roller along the unsupported portion of the tubing.

20. In a glass cutting machine, the combination with a cutter for cutting a groove in the glass, of a breaking off frame mounted parallel to the path of the cutter, and means for moving said frame away from the cutter and transversely of the glass.

21. In a glass cutting machine, the combination with a cutter for cutting a groove in the glass, of a breaking off frame mounted on a yielding pivot parallel to the path of the cutter, and means for rocking said frame about its pivot to bring it into engagement with the glass.

22. In a glass cutting machine, the combination with a breaking off frame mounted to move to intersect the path of the glass, of a roller mounted in the frame on one side of the path of the glass, and yielding means for holding the roller in engagement with the glass.

23. In a glass cutting machine, the combination with a breaking off frame pivoted parallel to the path of the glass, of rollers mounted in said frame on each side of the path of the glass, a resilient support for the pivot of the frame, and means for rocking the frame about its pivot.

24. In a glass cutting machine, the combination with a breaking off frame pivoted parallel to the path of the glass, of rollers mounted in said frame on each side of the path of the glass, a crank mounted on a shaft eccentric to the pivot, and a pin in said crank extending into a slot in said frame.

In witness whereof, I have hereunto set my hand this 16th day of September 1907.

JOHN E. GRAYBILL.

Witnesses:
EDWARD J. LOUCKS,
ADA ALLISON.